Dec. 5, 1961  F. D. LONG  3,011,937
MEDIUM FLUTER
Filed Jan. 11, 1960  4 Sheets-Sheet 1
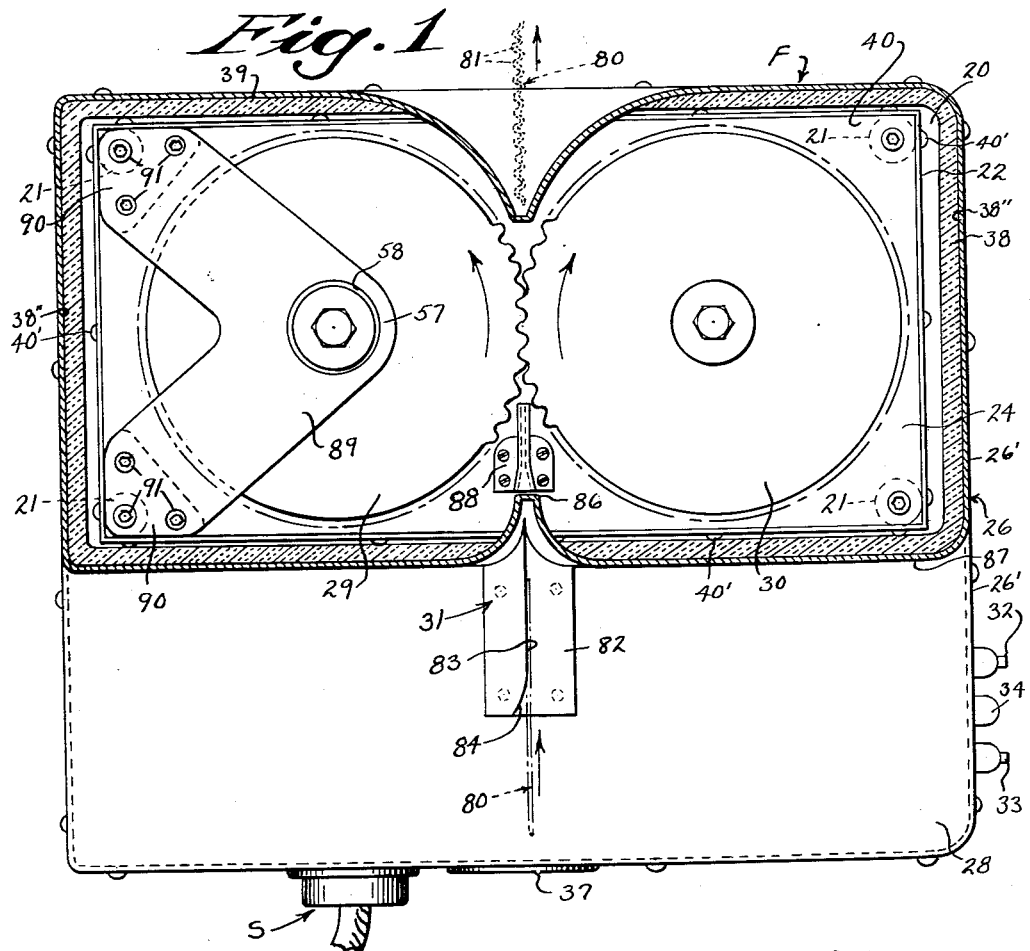
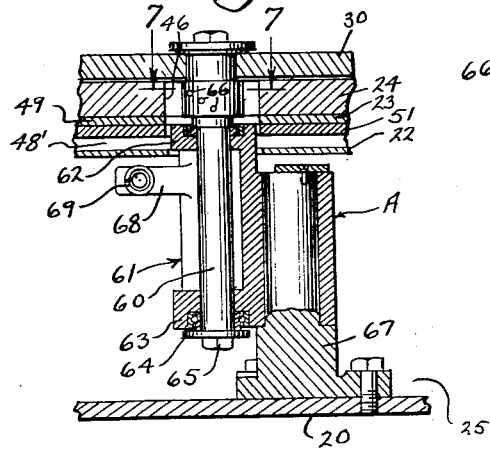
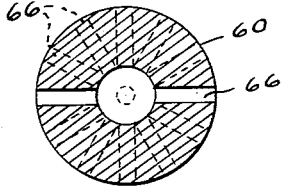
INVENTOR
FLEMING D. LONG
BY *Wright & Wright*
ATTORNEYS

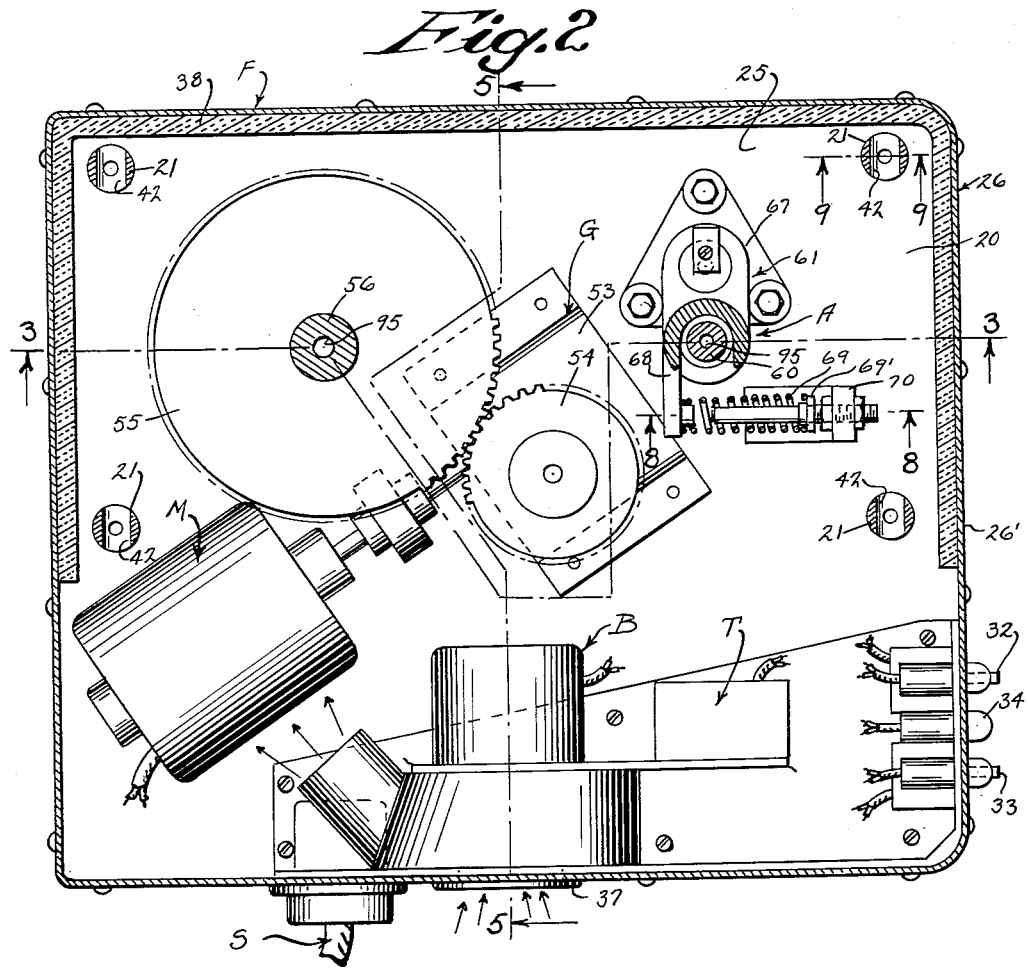
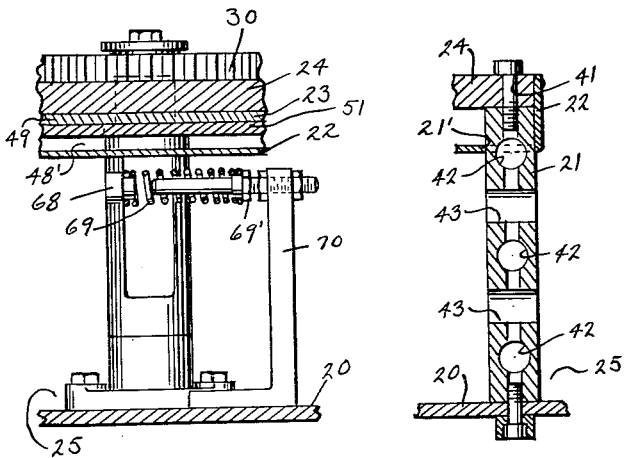

Dec. 5, 1961   F. D. LONG   3,011,937
MEDIUM FLUTER
Filed Jan. 11, 1960   4 Sheets-Sheet 3

INVENTOR
FLEMING D. LONG

BY
*Wright & Wright*
ATTORNEYS

Dec. 5, 1961     F. D. LONG     3,011,937
MEDIUM FLUTER
Filed Jan. 11, 1960     4 Sheets-Sheet 4
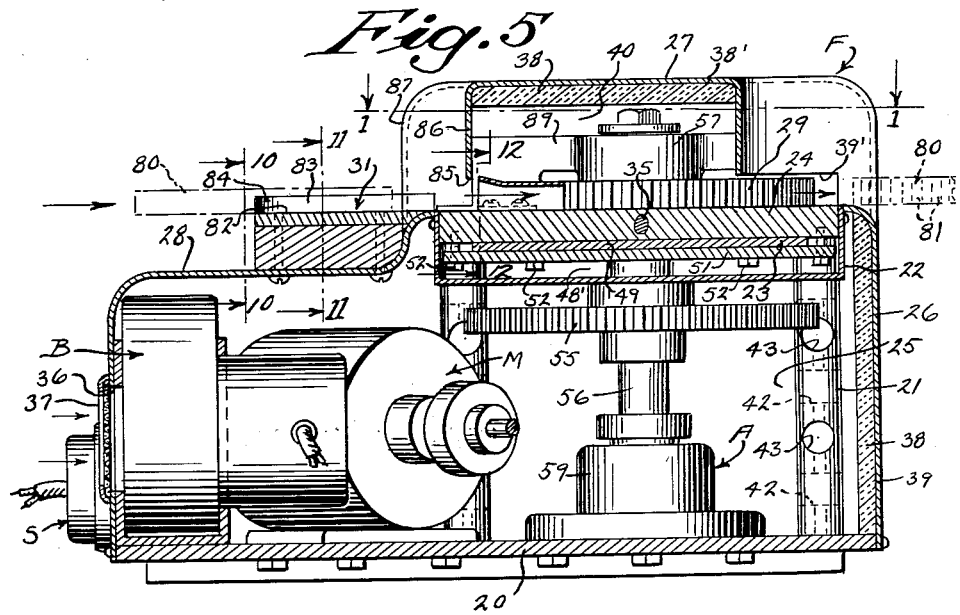
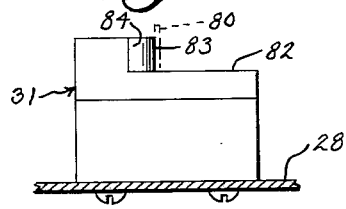
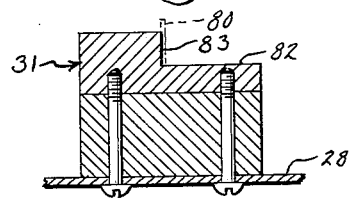
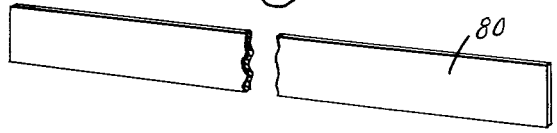
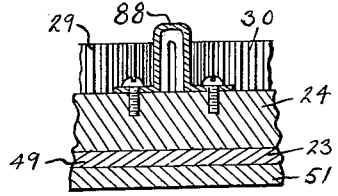
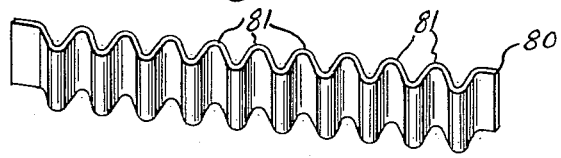
INVENTOR
FLEMING D. LONG
BY
*Wright and Wright*
ATTORNEYS

United States Patent Office 3,011,937
Patented Dec. 5, 1961

3,011,937
MEDIUM FLUTER
Fleming D. Long, Chicago, Ill., assignor, by mesne assignments to Liberty Engineering Company, Beloit, Wis.
Filed Jan. 11, 1960, Ser. No. 1,819
6 Claims. (Cl. 156—588)

This invention appertains to testing equipment and more particularly to a medium fluter utilized for making a portion of a fluted sample corrugated medium. This sample is in turn utilized as part of a medium test evaluation to measure the crush resistance and other characteristics of the corrugated medium.

The users of corrugated boxes and corrugated boards, for whatever particular use, should establish the strength, crush resistance, and general characteristics of the corrugated medium needed so that the right thickness and grade of material for a particular job can be readily selected and used. To accomplish this a number of samples of the same grade and general characteristics must be used for the test of the medium. A common prior method for evaluating the quality of corrugated medium has been called the ring crush test but this test is not completely accurate or satisfactory for many reasons, one being the inability to maintain in each sample the same dimensions, moisture content, etc., all of which influence the accuracy of the test results. Therefore, a need exists in the art for making samples, uniform in quality, general characteristics and moisture content. Some test samples are cut from standard stock but this is not satisfactory in that attaining an exact sample similar in form in each instance is difficult and also due to the fact that much of the testing is done to ascertain what type of stock should be used. Therefore, it is desirable to be able to make accurate samples which can be tested and the quality, moisture content and crush resistance of the same readily ascertained and which, of course, will maintain consistency in each sample of any given thickness of paper board.

As previously mentioned, the sample itself must be accurately produced so that the results obtained are accurate and dependable and the answer to a manufacturer's needs can then be reliable and known.

The medium test referred to for evaluating the crush resistance of corrugated medium developed by applicant includes broadly four steps: Step 1 involves the fluting of the single strip by means of the machine described and illustrated in this application. Step 2 includes the placing of the fluted sample in a rack and comb so that the flutes of the sample are held firmly to the rack. In Step 3 a double-coated Scotch tape is secured to the fluted sample to form a single face specimen and the sample is then carefully lifted straight up from the rack to avoid damaging the flutes. Step 4 involves the actual testing (tear test, crush test and the like). For the crush test, the specimen or sample is then placed in a suitable standard compression tester of the type having rigidly fixed and parallel platens. Two of these testers now on the market are the Hinde & Dauch tester and the Thwing & Albert tester. A part of my novel method of the medium test includes covering the platens with crocus cloth in such a way that the cloth will not slip on the platens. Then strips of double-coated Scotch tape are carefully applied to the crocus cloth so that no ridges are formed and thus will serve to hold the crocus cloth in place on the platens. The crocus cloth eliminates leaning corrugation failures.

It is therefore a primary object of my present invention to provide an accurate, fast and dependable machine for producing a single fluted strip sample (step 1) wherein each sample from the same paper stock will be alike in every detail.

Another important object of my present invention is to provide a medium fluter for forming a fluted sample in which no conditioning time is required after fluting the specimen, making it possible to run between 130–180 tests an hour depending on the test level of the medium.

Still another object of my present invention is to provide fluting rolls, machined and polished to a high degree of accuracy and which rolls are heated and maintained at an even temperature, plus or minus 10 degrees, so that the moisture content and flexibility of the fluted sample will be maintained constant.

Another object of my present invention is to provide a novel arrangement which will maintain constant and even pressure on the fluting rolls to further aid in forming a constant and never varying sample.

A salient feature of my present invention resides in the accurate and novel manner of constructing the medium fluter in every detail so that a constant heated temperature will be maintained in the fluting rolls, a constant and even pressure will be maintained without affecting the other moving parts of the machine and without overheating the motor which drives the fluting rollers at a constant speed.

A further object of my present invention is to provide a novel means for guiding the strip into accurate alignment with the fluting rollers so that the entrance of the strip into the rollers will be constant and will not vary.

An important object of my present invention resides in insulating the compartment which houses the fluting rollers and heating elements from the compartment which houses the drive motor, gears, gear reduction, blowers and electrical wiring.

A further object of the invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which FIGURE 1 is a top plan view of the machine, partly in section, the section being represented by the line 1—1 of FIGURE 3 of the drawing, looking in the direction of the arrows and also being indicated by the line 1—1 of FIGURE 5 of the drawing, the view showing details in the strip guide and fluting rollers;

FIGURE 2 is a horizontal section taken through the entire machine, the section being represented by the line 2—2 of FIGURE 3 of the drawing, looking in the direction of the arrows and illustrating details in the novel structure and location of various parts in the lower compartment;

FIGURE 5 is a vertical section through the machine, the section being taken on the line 5—5 of FIGURE 2 of the drawing, looking in the direction of the arrows, and also being represented by the line 5—5 of FIGURE 3 of the drawings;

FIGURE 6 is a fragmentary vertical section through my novel resilient mounting means for one of the fluted rollers, the section being taken on the line 6—6 of FIGURE 3 of the drawing, looking in the direction of the arrows;

FIGURE 7 is a horizontal section taken through the upper portion of my novel resilient, fluted roller mounting arrangement shown in FIGURE 6, the section being taken on the line 7—7 of FIGURE 6 of the drawing and looking in the direction of the arrows;

FIGURE 8 is also a fragmentary vertical section illustrating my novel mounting means for resiliently urging one fluted roller towards the other, the section being taken at right angles to that illustrated in FIGURE 6 of the drawing and being represented by the line 8—8 of FIGURE 2 and looking in the direction of the arrows;

FIGURE 9 is a transverse vertical sectional view through one of the supporting posts illustrating details in the novel construction of the post and means for securing the heater plate and insulator pan in position, the section being taken on line 9—9 of FIGURE 2 of the drawings and looking in the direction of the arrows;

FIGURE 10 is a front elevational view of my novel strip guide, also showing means for mounting it to the housing, the housing being in section and the section being represented by the line 10—10 of FIGURE 5 and looking in the direction of the arrows;

FIGURE 11 is a fragmentary vertical section through the housing and with the section being taken on the line 11—11 of FIGURE 5 and looking in the direction of the arrows;

FIGURE 12 is also a fragmentary vertical section through the strip guide assembly, the section being represented by the line 12—12 of FIGURE 5 and looking in the direction of the arrows;

FIGURE 13 is an elevational view in perspective of a paper board strip prior to its being fluted or corrugated; and FIGURE 14 represents a perspective view in elevation of the completed fluted corrugated medium strip as it comes from the machine.

Referring to the drawings in detail wherein similar reference characters designate corresponding parts throughout the several views, the letter F generally indicates one type of my improved medium fluter.

Figure 3:
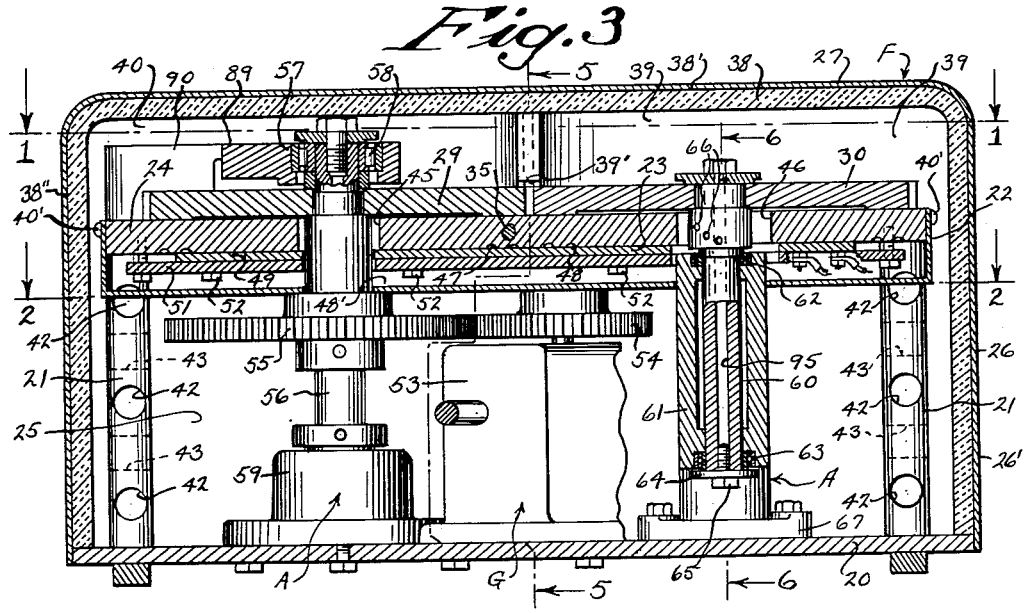
FIGURE 3 is a vertical transverse section taken on the line 3—3 of FIGURE 2 of the drawing, looking in the direction of the arrows.

Referring now in particular to FIGURES 1, 2, 3 and 5 of the drawings, it can be seen that my medium fluter F includes broadly a base plate 20 which forms a support for the entire machine F and has firmly secured thereto the motor M, blower B, gear reduction G and lower assembly A for rotatingly supporting the fluting rollers. I also provide four spaced posts 21 located in the rearward portion of the machine and which are utilized to support the insulating pan 22. This pan is utilized partially to insulate the heating element 23 and heating plate 24 from the lower area or compartment 25 of the machine F.

Covering the entire apparatus and secured to the base plate 20 is an outer housing 26 and it will be noted that this housing has a rearward stepped upper wall 27 and a lower wall 28 connected by a vertical wall 87. The lower wall portion 28 forms a cover primarily for the motor M and the blower B and other electrical control apparatus while the upper wall portion 27 houses the fluting roller 29 and the idler fluting roller 30, as well as portions of the guide means 31, pan 22, etc.

On one side wall 26' of the housing 26 (note in particular FIGURES 1 and 2) are a pair of switches 32 and 33 and an amber signal light 34. As will be described more fully, the switch 32 operates the heater elements for heating the plate 24 and the amber light 34 indicates when the proper temperature of the plate 24 is reached and is electrically connected with a sensing type thermistor 35 imbedded in the plate for this purpose. The switch 33 is utilized to turn the motor M and the blower B on and off as desired. The casing or housing 26 is also provided with a circular opening 36 in which a screen or air filter 37 is placed and through which cooling air is drawn by means of the blower B. The purpose for this and the general relationship of the blower B to the motor M will be described in detail as the description proceeds.

Further, the upper rearward stepped portion 27 of the housing is completely insulated and any appropriate insulation 38 can be utilized and it is to be further noted that this insulation extends completely around the top 38', side 38" and rear walls 39 of this portion of the housing. This is due to the fact that it is extremely important that a very even temperature be maintained in the fluting rollers. Obviously, the temperature in the rollers will affect the moisture content of the sample. However, it is obvious that the motor M cannot become over-heated and therefore, the heating elements and fluting rollers are completely insulated and separate in the upper compartment 40 while the motor and gear reduction portion G, etc. of the machine F are located in the lower compartment 25. Of course, the blower is thermostatically controlled so that it will not be constantly running and will operate only when needed. This is not shown in detail and any known type of control T now on the market may be utilized. In this conjunction, it should be noted that the air will travel in the direction of the arrows, FIGURES 2 and 5 of the drawings, and completely cool and circulate air throughout the lower area 25 of the machine. To further complete this insulation and separation of the fluting rollers and heating elements from other portions of the machine, I provide the insulating pan 22 which fits completely around the heating plate 24 and is firmly bolted thereto by means of bolts or screws 40.

The heating plate 24 on the other hand is supported directly by the four posts 21, respectively, which extend through corner apertures 21' in the pan 22. This plate 24 is shown in detail in FIGURE 4 of the drawings and the large corner apertures 41 are utilized for securing this plate to the post 21. Keeping in mind, again, the necessity of keeping an even temperature in the fluting rollers and also to reduce somewhat the weight of the machine, it should be noted that each post 21 is, in turn, provided with a series of spaced transverse apertures 42 and alternate spaced transverse apertures 43 at right angles to said first mentioned apertures and that, further, each post is provided with a central bore throughout its entire central axis. Thus, the transmission of temperatures from the plate 24 to the lower compartment 25, or vice versa, from the lower compartment to the plate, through the posts 21, will be considerably lessened.

Figure 4:
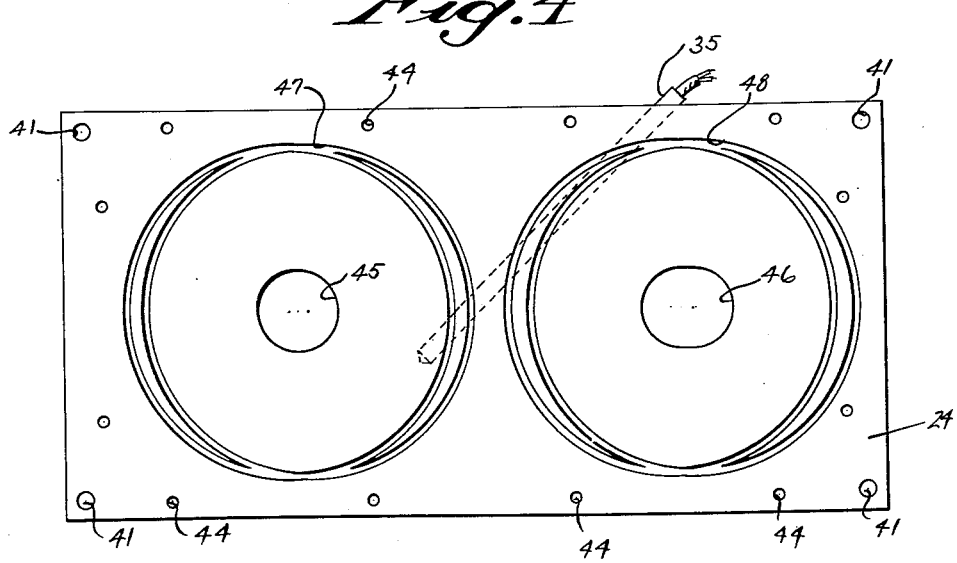
FIGURE 4 is a bottom plan view of the heating plate, the plate of course being shown removed from the machine.

Attention is now directed to the construction of the heating plate 24 and this shown in detail in FIGURE 4 of the drawings. FIGURE 4 shows a bottom plan view of the plate and it should be noted that in addition to the corner apertures 41 through which the bolts for securing the plate to the post pass, I also provide a series of smaller peripheral apertures 44 and these are utilized to receive the metal screws 52 retaining the heating elements in proper place. Along the central longitudinal axis of the plate I provide a pair of enlarged spaced openings 45 and 46 respectively and it is through these openings that the posts or supports for the axles and bearings of the fluting rollers extend and it should be noted that the opening 46 is slightly elliptical. This is to provide for the movement of the idler roller as it is urged towards the drive fluting roller under spring pressure. This feature will be brought out in detail further along. Around each opening 45 and 46 is a pair of grooves 47 and 48 respectively and these grooves are provided primarily to aid in the even heating of the plate 24, particularly in the vicinity of the fluting rollers 29 and 30, respectively (note FIGURE 3 of the drawings). In order to heat this plate 24 I provide a heating element 49 which lies flush with the under-surface of the plate and is connected to a source of electrical energy by means of the lead wires 50 through switch 33 and which source is indicated by the letter S. In order to retain the heating elements 49 in close proximity to the plate 24 I provide a retaining member 51 which is secured to the under-side of the plate by means of the metal screws 52. From the foregoing it can be seen that a very even temperature can be maintained in the fluting rollers 29 and 30 through the heating plate 24 and that the insulation and pan 22 will retain the heat in the proximity of the rollers with very little change. The heated air will quickly circulate in the grooves 47 and 48 and space 48' to quickly and evenly heat the plate 24 and thus the fluting rollers 29 and 30 respectively.

In order to further maintain this even temperature, it will be noted that the supports for the axles of each roller as well as the bearing are so formed as to provide space between the axles and the support so that the heat transmission will not be directly carried through metal parts from the upper roller portion of the machine to the lower cooler portion 25. The drive roller 29 is driven through the motor M by means of a gear reduction mechanism 53 which drives the gear 54 and larger gear 55. The gear 55 is mounted on the axles or shaft 56 that directly drives the fluting roller 29. As previously mentioned, it is necessary that extreme accuracy be maintained in the speed of rotation, the meshing of the teeth between the fluting rollers 29 and 30 so that the samples formed will be of the same characteristics in each case. Obviously, this is important when a series of tests is being run to bring out various characteristics of a medium and where more than one sample of the medium will be used. Therefore, I provide an upper support 57 which houses the bearing 58 for the axle or shaft 56 and the lower portion of the shaft 56 is provided with a similar bearing (not shown), which is housed in the lower base portion 59. The idler fluting roller 30 is rotated through the drive fluting roller 29 and is supported by means of the axle or shaft 60. This axle or shaft 60 is rotatably supported by the structure 61 which is so formed as to provide an upper bearing 62 and a lower bearing 63 being retained by means of a retaining washer 64 held in place by the metal screw 65. It should be further noted in FIGURES 3, 6 and 7 of the drawings that the upper portion of the axle or shaft 60 is provided with a series of transversely bored apertures 66 and these also aid in dissipating the direct transmission of temperatures between the upper and lower compartments, 40 and 25 respectively.

A salient feature of this device resides in the fact that the fluting roller 30 is maintained in contact with the drive fluting roller under constant and even pressure. This is accomplished by providing a base supporting member 67 secured to the base plate 20 and upon which is pivotedly mounted the support 61 (carrying the bearings 62, 63 and axle 60). The upper end of this support 61 is provided with a transversely extending leg 68 against which one end of the spring 69 is fixed. Noting also FIGURE 8 of the drawings, it can be seen that the other end of the spring 68 rests against an adjusting nut 69' which is held in place through the support 70. Thus, the exact tension on the spring 69 can be adjusted and an even constant pressure will be maintained between the two fluting rollers 29 and 30, in that the spring 69 constantly urges the support 61 through the leg 68 towards the fluting roller 29.

Obviously, the sample indicated by the numeral 80 is fed between the fluting rollers 29 and 30 and the flutes 81 are then placed in the sample as indicated by FIGURE 14. However, it is important that the sample be fed to the fluting rollers in the same position each time in keeping with maintaining the consistency and general characteristics of each sample and therefore, I provide my previously mentioned novel guide means 31 and this means includes a horizontal supporting table 82 and a vertical supporting wall 83, the forward end of the vertical wall 83 being curved slightly as indicated by the numeral 84 and thus, as indicated by FIGURE 1 of the drawings, the sample 80 (dotted line) can be positioned with its edge on the horizontal wall and its flat surface in alignment with and in engagement with the vertical wall 83. The housing of the machine is provided with a vertical slot 85 formed on an inner wall 86 in direct alignment with the vertical wall 83 and the point where the fluter rollers meet. The outer walls 87 of the housing are curved inwardly towards the wall 86 and slot 85 to further facilitate the proper positioning of the sample in relation to the rollers and finally, I provide inwardly of the slot 85 and in alignment therewith and just forward of the rollers, a guide piece 88 which forms a channel into which the sample 80 passes just prior to its engagement by the fluting rollers 29 and 30 respectively. After the sample has passed between the rollers it moves outwardly from the rear of the machine and is in its fluted form as indicated by dotted lines in FIGURE 1 of the drawings.

In order to further brace the drive fluting roller 29, the upper end of its axle 56 and bearing support 57 is firmly held by means of a V-shaped bracket 89 clearly shown in FIGURE 1 of the drawings and each end 90 thereof is firmly bolted to the pan by means of at least three metal screws 91.

It is obvious, inasmuch as this is a precision testing instrument, that the bracing and supporting of the fluting rollers as well as the control of the speed of the fluting rollers and the exact tension of the spring must be known and constant, and further, that the insulation of the lower compartment from the upper compartment be as complete as possible. This is due to the fact that the temperature in the lower compartment should be about 200° F. while the temperature in the fluting rollers should be about 350° F. Obviously, if the temperature in the lower compartment were higher, damage would result to the motor and the constant speed desired would not be accomplished. In fact, in continued tests of this machine it was found that the temperature of the fluting rollers could be maintained at 350° F. plus or minus while the temperature of the spring and the support for the shaft of the pressure roller could be maintained at 135° F. Obviously, this would help to increase the life of the spring as well as the shaft and support of the pressure roller.

Obviously, the rear wall 39 of the housing 26 is also formed with a slot 39' so that the finished sample can pass from the machine. Further, the axles or shafts 56 and 60 are each provided with an axial bore 95 to lessen heat transference and to receive the retaining screws, etc.

It has been found through testing that the fluting rollers should be rotated at approximately 4½ r.p.m. and that a desirable spring pressure is 22½ pounds. However, this particular speed and pressure could be varied, the important thing being that they remain constant once they are set.

From the foregoing, it is believed that the features and advantages of my invention will be readily apparent to those skilled in the art and it will of course be understood that changes in the form, proportion and minor details of construction may be resorted to without departing from the spirit of the invention or the scope of the appended claims.

I claim:

1. A medium fluter comprising a substantially rectangular base plate, a housing secured to said base plate about its outer periphery, said housing including front, back and side walls, a stepped top wall for said housing providing a lower top forward surface, a relatively higher rear top surface, an insulating pan supported horizontally in said housing below and spaced from said higher top wall surface and dividing the inner space of said housing into two compartments, said upper compartment housing and supporting a horizontally positioned heating plate, a pair of engaging toothed fluting rollers above and adjacent said heating plate, and said lower compartment housing a drive motor, a gear reduction means, and drive and supporting means for said fluting rollers, means associated with said upper compartment for guiding and positioning a sample strip in alignment with said fluting rollers, and means connecting said motor with a source of electrical energy.

2. A medium fluter as set forth in claim 1 wherein said top, back and side walls adjacent said upper compartment are provided with insulating material.

3. A medium fluter for producing a fluted corrugated medium from a substantially flat length of strip material comprising a rectangular base plate, a housing including front, back and side walls and a stepped top wall so constructed and arranged as to provide a lower top forward surface and a relatively higher top rearward surface, said housing being secured to said base plate about its outer periphery, four vertical posts secured to said base plate within the confines of said top rear portion of said top wall, said posts extending upwardly and terminating at a point slightly above the plane of the lower forward top wall surface, a rectangular heating plate supported by said posts, an insulating pan depending from said heating plate and secured to the outer periphery thereof, vertically extending spaced axles projecting through said pan and said heating plate, a pair of engaging toothed fluting rollers secured to a respective axle and positioned adjacent and above said heating plate, an electric motor secured to said base plate in drive connection with one of said axles, a blower adjacent said motor having means for directing a flow of air over and around said motor, said insulating pan dividing the inner space of said housing into an upper compartment and a lower compartment, means insulating one compartment from the other, said fluting rollers and heating plate being confined in said upper compartment and said motor, blower and drive means being confined in said lower compartment, guide means associated with said upper compartment for guiding and positioning a flat length of strip material in alignment with said toothed fluting rollers, and means connecting said motor and said blower with a source of electrical energy.

4. A medium fluter as set forth in claim 3 wherein said guide means includes a block secured to said top wall surface immediately adjacent said stepped portion providing a flat horizontal table and a vertical wall at right angles thereto, a slot in said stepped portion and a guide channel member in said upper compartment in alignment with said slot and the fluting rollers.

5. A medium fluter as set forth in claim 3 wherein said supporting posts are provided with a series of spaced transverse apertures and a vertical axial bore therethrough whereby direct transmission of heat from one compartment to the other is greatly lessened.

6. A medium fluter as set forth in claim 3 wherein said idler axle for said idle fluting roller is pivotedly supported by said base plate, and under spring pressure for constantly urging the same towards the drive fluting roller.

References Cited in the file of this patent

UNITED STATES PATENTS

| | | |
|---|---|---|
| 1,587,963 | Knopf | June 8, 1926 |
| 1,629,743 | Scott | May 24, 1927 |
| 2,862,542 | Norton | Dec. 2, 1958 |